(12) United States Patent
Martin et al.

(10) Patent No.: US 8,825,373 B1
(45) Date of Patent: Sep. 2, 2014

(54) CORRECTING PATH ERRORS FOR VEHICLE NAVIGATION

(71) Applicant: Google Inc., Mountain View, CA (US)

(72) Inventors: David R. Martin, Oakland, CA (US); Bryan M. Klingner, Austin, TX (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/705,376

(22) Filed: Dec. 5, 2012

(51) Int. Cl.
G01C 21/34 (2006.01)

(52) U.S. Cl.
USPC .......................................................... 701/410

(58) Field of Classification Search
USPC ......... 701/410–412, 421, 452, 468, 469, 473, 701/518, 203, 209, 210, 213, 300; 382/278, 382/291, 292
See application file for complete search history.

(56) References Cited

U.S. PATENT DOCUMENTS

| | | | |
|---|---|---|---|
| 6,907,336 B2 * | 6/2005 | Gray et al. ....................... 701/50 |
| 8,259,994 B1 | 9/2012 | Anguelov et al. |
| 2006/0013437 A1 * | 1/2006 | Nister et al. ................... 382/103 |
| 2009/0138151 A1 * | 5/2009 | Smid et al. ....................... 701/27 |
| 2009/0157301 A1 * | 6/2009 | Tien et al. ....................... 701/204 |
| 2009/0240481 A1 * | 9/2009 | Durrant-Whyte et al. ........ 703/7 |
| 2010/0088146 A1 * | 4/2010 | Zhong et al. ....................... 705/9 |
| 2011/0026910 A1 * | 2/2011 | Liang et al. .................... 396/213 |
| 2012/0045091 A1 * | 2/2012 | Kaganovich .................. 382/103 |
| 2013/0116921 A1 * | 5/2013 | Kasargod et al. ............. 701/472 |
| 2013/0325334 A1 * | 12/2013 | Mian et al. ..................... 701/518 |
| 2013/0332065 A1 * | 12/2013 | Hakim et al. .................. 701/411 |

* cited by examiner

Primary Examiner — Mary Cheung
Assistant Examiner — Rodney Butler
(74) Attorney, Agent, or Firm — Lerner, David, Littenberg, Krumholz & Mentlik, LLP

(57) ABSTRACT

An apparatus and method are disclosed for performing loop closing on one or more paths to be optimized. The paths may include poses associated with imagery obtained by a vehicle. The apparatus may identify candidate intersections from the paths based on their proximity, and may further determine relative poses from the poses of the paths using structure-from-motion techniques. The apparatus may then apply a partitioning schema to the paths to be optimized to obtain individual partition cells. The partition cells may then be sent to one or more client devices for optimizing the paths included in the partition cells. When the apparatus receives a set of optimized paths from the client devices, the apparatus may re-partition the paths to be optimized to ensure that non-optimized portions of paths are optimized.

20 Claims, 11 Drawing Sheets

CORRECTING PATH ERRORS FOR VEHICLE NAVIGATION

BACKGROUND

Computer vision techniques have been employed to map or analyze the trajectory of an object as it travels along a path. A loop closing process may be used to correct large scale, low-frequency errors in paths by applying constraints that link parts of the path together at path intersections, namely where the path loops back on itself. However, large quantities of images and other data make such techniques challenging to implement in large scale systems in a time-sensitive manner.

BRIEF SUMMARY

This disclosure provides for a system for performing loop closing. In one embodiment, the system includes a computer-readable memory that stores a plurality of paths to be optimized, wherein each path of the plurality of paths comprises one or more poses associated with a mobile apparatus. The system may also include a processor in communication with the computer-readable memory, where the processor may be configured to identify a plurality of candidate intersections from the one or more poses, determine a plurality of relative poses from the plurality of identified candidate intersections, and apply a partitioning schema to the plurality of paths to obtain one or more partition cells, wherein each one of the plurality of paths is assigned to at least one of the one or more partition cells.

The processor may also be configured to send the one or more partition cells to one or more client devices for optimizing the paths assigned to the one or more partition cells, wherein the client device uses at least one relative pose from the plurality of relative poses as a constraint in optimizing the paths assigned to the one or more partition cells, and receive optimized paths from the client device, the optimized paths being based on at least one relative pose from the plurality of relative poses assigned to the one or more partition cells sent to the client device.

In another embodiment of the apparatus, the processor may be further configured to identify a candidate intersection from the plurality of candidate intersections based on the proximity of a first pose from a first one of the plurality of paths to a second pose from a second one of the plurality of paths.

In a further embodiment of the apparatus, the processor may be further configured to determine a given one of the plurality of relative poses by applying a structure-from-motion technique to a first image associated with a first one of the plurality of paths and a second image associated with a second one of the plurality of paths.

In yet another embodiment of the apparatus, the processor may be further configured to determine a boundary stabilizer for a portion of a given one of the paths assigned to the at least one partition cell, the boundary stabilizer identifying the portion of the path that is not to be optimized by the client device.

In yet a further embodiment of the apparatus, the boundary stabilizer may identify a location where the portion of the given path crosses a boundary of the partition cell to which the path is assigned.

In another embodiment of the apparatus, the boundary stabilizer may include a pair of geolocation coordinates.

In a further embodiment of the apparatus, the partitioning schema may be based on computing resources available to the one or more client devices.

In yet another embodiment of the apparatus, the processor may be further configured to re-apply the partitioning schema to the plurality of paths to be optimized based on whether non-optimized portions of the paths assigned to the one or more partition cells remain after optimization by the one or more client devices.

In yet a further embodiment of the apparatus, the processor may be further configured to re-determine the boundaries of the one or more partition cells based on whether non-optimized portions of the paths assigned to the one or more partition cells remain after optimization by the one or more client devices.

In another embodiment of the apparatus, the processor may be further configured to iteratively apply the partitioning schema to the plurality of paths to obtain the one or more partition cells and to send the one or more partition cells to the one or more client devices for optimizing the paths assigned to the one or more partition cells until a predetermined termination condition is met.

This disclosure also provides a method for performing loop closing. In one embodiment, the method may include identifying a plurality of candidate intersections from one or more poses of a plurality of paths to be optimized, and determining, with a processor, a plurality of relative poses from the plurality of identified candidate intersections. The method may also include applying, with the processor, a partitioning schema to the plurality of paths to obtain one or more partition cells, wherein each of the plurality of paths is assigned to at least one of the one or more partition cells. The method may further include sending, with the processor, the one or more partition cells to a client device for optimizing the paths assigned to the one or more partition cells, and receiving optimized paths from the client device, at least one of the optimized paths being based on at least one relative pose from the plurality of poses.

In another embodiment of the method, identifying the plurality of candidate intersections may include identifying a candidate intersection from the plurality of candidate intersections based on the proximity of a first pose from a first path of the plurality of paths to a second pose from a second path of the plurality of paths.

In a further embodiment of the method, determining the plurality of relative poses may include determining a relative pose from the plurality of relative poses by applying a structure-from-motion technique to a first image associated with a first path of the plurality of paths and a second image associated with a second path of the plurality of paths.

In yet another embodiment of the method, the method includes determining, with the processor, a boundary stabilizer for a portion of a path of the paths assigned to the at least one partition cell, the boundary stabilizer identifying a portion of the path that is not to be optimized by the client device.

In yet a further embodiment of the method, the boundary stabilizer may identify a location where the portion of the path crosses a boundary of the partition cell to which the path is assigned.

In another embodiment of the method, the boundary stabilizer may include a pair of geolocation coordinates.

In a further embodiment of the method, the partitioning schema of the plurality of paths may be based on computing resources available to the client device.

In yet another embodiment of the method, the method may include re-applying, with the processor, the partitioning schema to the plurality of paths to be optimized based on whether non-optimized portions of the paths assigned to the one or more partition cells remain after optimization by the client device.

In yet a further embodiment of the method, the method may include re-determining, with the processor, the boundaries of the one or more partition cells based on whether non-optimized portions of the paths assigned to the one or more partition cells remain after optimization by the client device.

In another embodiment of the method, the method may include iteratively performing, with the processor, the applying of the partitioning schema to the plurality of paths to obtain the one or more partition cells and the sending of the one or more partition cells to a client device for optimizing the paths assigned to the one or more partition cells until a predetermined termination condition is met.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
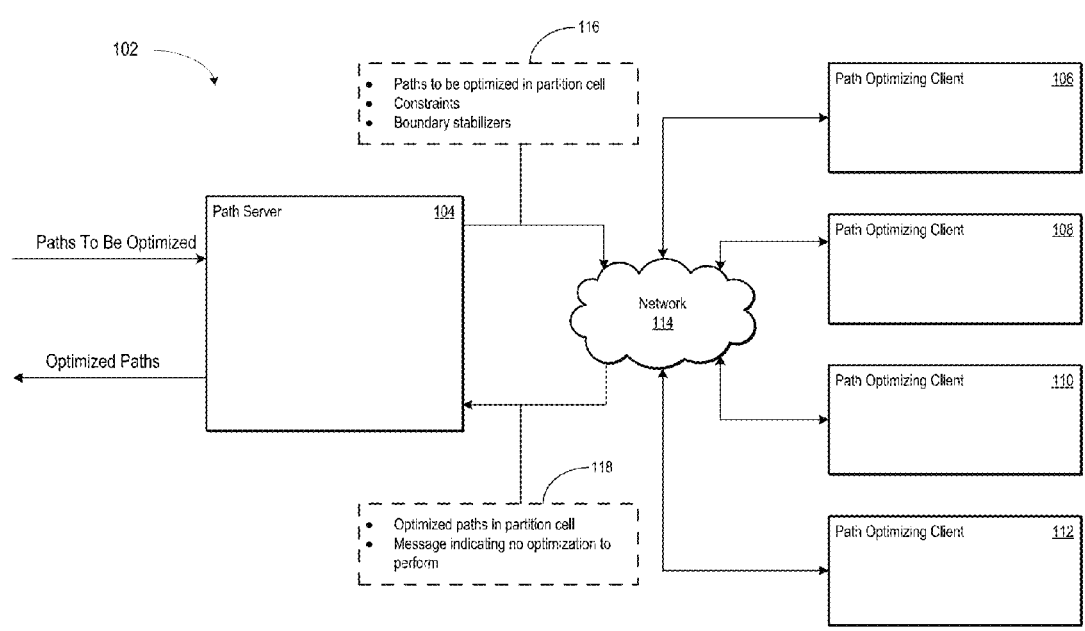
FIG. 1 illustrates an example of a path server in communication with path optimizing client devices according to aspects of this disclosure.

This disclosure provides for systems and methods to perform path optimization, for instance using structure from motion ("SFM") constraints. According to one aspect, large-scale path optimization and coordination of path optimization between path optimizing client devices and a path server are provided.

In an embodiment of the disclosed system, a path server may receive one or more paths to be optimized. The one or more paths may include one or more "poses" of a vehicle. Each pose includes attributes that define the three-dimensional position and orientation of a vehicle-mounted camera at a particular time. The pose of the camera-mounted vehicle may be determined using various techniques, such as using the Global Positioning System ("GPS") with inertial constraints and odometry sensors. Imagery obtained by the vehicle may be associated with one or more of the poses of a vehicle path. In one embodiment, the imagery may include a street-level image of a geographic location. The street-level image may be a raw camera image, a camera point cloud image, a laser point cloud image, or any other type of street-level image.

In one embodiment, the server may perform "loop closing" on one or more of the paths to be optimized. Loop closing is the process of correcting large scale, low-frequency errors in paths by applying constraints that link parts of the path together at intersections, namely where the path loops back on itself. For loop closing, the path server may initially determine candidate intersections for the one or more paths to be optimized. A candidate intersection may be an intersection where one or more of the paths intersect. The path server may then determine a rigid transform that establishes a relationship (e.g., translation and/or rotation) between the one or more paths of the candidate intersections. The path server may also determine various constraints (e.g., gravity constraints, odometry constraints, geolocation constraints) for optimizing the one or more paths. The path server may use SFM techniques to determine the constraints and/or rigid transform for one or more of the paths.

At this point, the one or more paths may be ready for optimization. Accordingly, the path server may determine a partitioning schema by which to divide the one or more paths into partition cells for optimization. Based on the partitioning schema, the path server may communicate partition cells to one or more path optimizing client devices to perform the optimization. As discussed below, a partition cell may include various types of data, into the paths to be optimized, path constraints, and boundary stabilizers. When an optimization is complete, a path optimizing client device may send an optimized set of paths to the path server.

To ensure that the entire set of paths has been optimized, the path server may continue iterating over the set of paths in this fashion (i.e., sending paths to be optimized to one or more path optimizing client devices) until a predetermined condition is met, such as receiving a message from one or more of the path optimizing clients that there is no further optimization to be performed, that the path server has performed a predetermined number of iterations on the paths to be optimized, or any other predetermined condition.

FIG. 1 illustrates an example of an apparatus 102 configured to perform path optimizing according to aspects of the disclosure. In one embodiment, the apparatus 102 may include a path server 104 in communication with one or more path optimizing client devices 106-112. Exemplary embodiments of a path server 104 and a path optimizing client 106 are discussed with reference to FIG. 2 and FIG. 9, respectively. In general, the planet server 104 may be any type or combination of computers, such as a server, desktop computer, a server farm, a server cluster, or combinations thereof. The path optimizing clients 106-112 may be any type or combination of client devices including, but not limited to, a desktop computer, a mobile device, a laptop computer, a computer cluster, or any other type of client device.

The path server 104 and the path optimizing clients 106-112 may communicate via a network 114. The network 114 may be implemented as any combination of wired or wireless networks. For example, and without limitation, the network 114 may include a Wide Area Network ("WAN"), such as the Internet; a Local Area Network ("LAN"); a Personal Area Network ("PAN"), or a combination of WANs, LANs, and PANs. Moreover, the network 114 may include the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Figure 2:
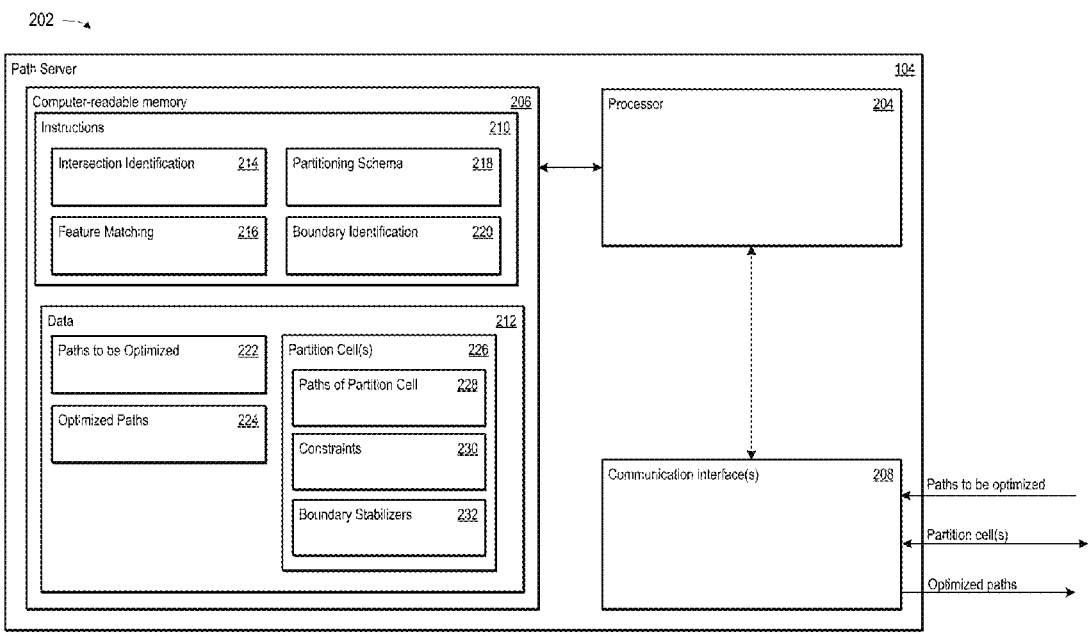
FIG. 2 illustrates an example of the path server of FIG. 1 according to aspects this disclosure.

In communicating with the path optimizing clients 106-112, the path server 104 may send to, and receive from, the path optimizing clients 106-112 various types and amounts of data 116-118. As introduced above and with further details in reference to FIGS. 3-8, the data 116 sent to the path optimizing clients 106-112 may include, as shown in FIG. 2, paths 228 to be optimized for a partition cell, one or more constraints 230 that facilitate the path optimization, and one or more boundary stabilizers 232 that identify portions of the paths 228 in the selected partition cell that are to be excluded from optimization. As discussed with reference to FIG. 7, the boundary stabilizers 232 may prevent path optimization on portions of the paths 228 in the partition cell, such as the portions of the paths 228 that cross the partition cell boundary, so as to prevent misalignment of those paths 228 in adjacent partition cells.

When optimization on a partition cell is complete, the path server 104 may receive optimized paths from a corresponding path optimizing client. However, receiving optimized paths for a given partition cell 112 may not necessarily mean that the optimization of all the paths is complete. As discussed with reference to FIG. 10, the path server 104 may continuously perform one or more grid partitionings on the paths to be optimized until one or more a predetermined conditions are satisfied. In one embodiment, a predetermined condition may be that the path server receives one or more messages from the path optimizing clients 106-112 that no optimization was performed (i.e., the paths to be optimized for a selected partition cell are already optimized). In another embodiment, a predetermined condition may be that the path server has performed a predetermined number of grid partitionings on the paths to be optimized (e.g., one grid partitioning, five grid partitionings, etc.).

The path server 104 may include various instructions and data for determining constraints of the paths to be optimized and for performing grid partitioning on those paths. FIG. 2 is an example 202 of the path server 104 according to aspects of the disclosure. In one embodiment, the path server 104 includes a processor 204, a computer-readable memory 206, and one or more communication interfaces 208.

The computer-readable memory 206 may store information accessible by the processor 204. For example, the computer-readable memory 206 may store instructions 210 and data 212. The instructions 210 and/or data 212 may be executed or otherwise used by the processor 204 to identify candidate intersections from the paths to be optimized and determine constraints and/or rigid transformations for the paths associated with the candidate intersections. The instructions 210 and/or data 212 may also be used to partition the paths to be optimized into partition cells for optimization by the path optimizing clients 106-112.

In general, the computer-readable memory 206 may be of any type of computer-readable memory operative to store information accessible by the processor 204, including a computer-readable medium, or other medium that stores data that may be read with the aid of an electronic device. Examples of the computer-readable memory 206 include, but are not limited to, a hard-drive; a memory card; non-volatile memory, such as non-volatile random-access memory ("NVRAM"), read-only memory ("ROM"), or other non-volatile memory; volatile memory, such as dynamic random-access memory ("DRAM") or other random-access memory ("RAM"); as well as other write-capable and read-only memories. Systems and methods may include different combinations of the foregoing, whereby different portions of the instructions and data are stored on different types of media.

The processor 204 may be any conventional processor, including Reduced Instruction Set Computing ("RISC") processors, Complex Instruction Set Computing ("CISC") processors, Advanced RISC Machine ("ARM") processors, or combinations of the foregoing. Alternatively, the processor may be a dedicated device such as an applicant-specific integrated circuit ("ASIC").

The communication interface 208 may be any type of communication interface, or combination of communication interfaces, configured to receive the paths to be optimized, communicate with the path optimizing clients 106-112, and provide the paths that were optimized by the ath optimizing clients 106-112. Examples of communication interfaces include tactile interfaces, such as keyboards, mice and touch-screen displays; non-tactile interfaces, such as a speaker or microphone; data interfaces, such as an IEEE 1394 ("Firewire") interface or Universal Serial Bus ("USB") interface; wired or wireless networking interfaces, such as an Ethernet interface or an IEEE 802.11 interface, and other such communication interfaces or combination of communication interfaces.

Although FIG. 2 functionally illustrates the processor 204, the computer-readable memory 206, and other elements of the path server 104 as being within the same block, it will be understood by those of ordinary skill in the art that the processor 204 and the computer-readable memory 206 may actually comprise multiple processors and memories that may or may not be stored within the same physical housing. For example, the computer-readable memory 206 may be a hard drive, memory card, or other storage media located in a housing different from that of the path server 104.

Accordingly, references to a processor, computer or memory will be understood to include references to a collection of processors, computers or memories that may or may not operate in parallel. Rather than using a single processor to perform the acts described herein, some of the components, such as the communication interface(s) 208, may each have their own processor that only performs calculations related to the component's specific function.

In addition, the instructions 210 may be any set of instructions that may be executed directly (such as machine code) or indirectly (such as scripts) by the processor 204. For example, the instructions 210 may be stored as computer code on the computer-readable medium. In that regard, the terms "instructions" and "programs" may be used interchangeably herein. The instructions 210 may be stored in object code format for direct processing by the processor 204, or in any other computer language including scripts or collections of independent source code modules that are interpreted on demand or compiled in advance. Functions, methods and routines of the instructions 210 are explained in more detail below.

In one embodiment, the instructions 210 may include one or more instructions for optimizing and partitioning paths including intersection identification instructions 214, feature matching instructions 216, partitioning schema instructions 218, and boundary identification instructions 220. Although FIG. 2 illustrates that the instructions 210 may include instructions 214-220, the computer-readable memory 206 may also include other instructions typically found in a computer, server, or other computing device. For example, the computer-readable memory 206 may include operating system instructions, memory management instructions, instructions for communicating and managing one or more partition cells, and other such instructions. Moreover, the computer-readable memory 206 of the path server 104 may be loaded or unloaded with different instructions.

The path server 104 may also include the data 212 for optimizing and partitioning paths. The data 212 may be retrieved, stored, or modified by the processor 204 in accordance with the instructions 210. For instance, although the disclosed embodiments are not limited by any particular data structure, the data 212 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 212 may comprise any information sufficient to identify the relevant information, such as numbers, descriptive text, proprietary codes, references to data stored in other areas of the same memory or different memories (including other network locations) or information that is used by a function to calculate the relevant data.

In one embodiment, the data 212 may include the one or more paths to be optimized 222. The paths to be optimized 222 may include one or more poses of the vehicle. Each of the poses may also include geolocation coordinates, such as a latitude and longitude coordinate, which identify a geographic location for a given pose. A pose may also be associated with one or more images that were obtained by the vehicle of the geographic location associated with the pose. As discussed previously, the images may include raw camera images, laser point cloud images, radar intensity images, and other such images. The images associated with a pose may also be street-level images of the geographic location associated with the pose.

Figure 3:
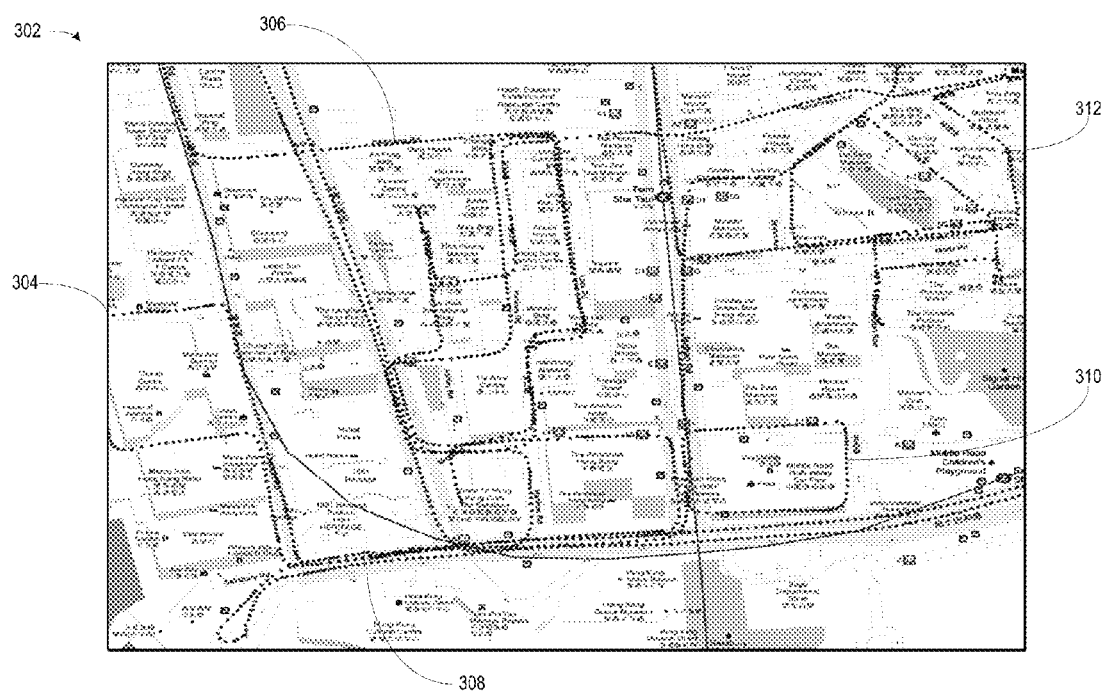
FIG. 3 illustrates an example of paths to be optimized according to aspects of the invention.

FIG. 3 is an example 302 of paths to be optimized 306-312 according to aspects of the disclosure. The paths to be optimized 306-312 shown in FIG. 3 may correspond to the paths to be optimized 222 stored in the computer-readable memory 206. In one embodiment, the paths to be optimized 306-312 may be obtained from the vehicle moving through a geographic region 304. In another embodiment, the paths to be optimized 306-312 may be obtained from other mobile apparatuses, such as a bicycle, backpack, etc.

In one embodiment, the path server 104 may be in communication with the vehicle, and may receive the paths to be optimized 306-312 from the vehicle. In another embodiment, the path server 104 may receive the paths to be optimized 306-312 from a human operator or from another system in communication with the path server 104. Combinations of the foregoing are also possible.

Figure 4:
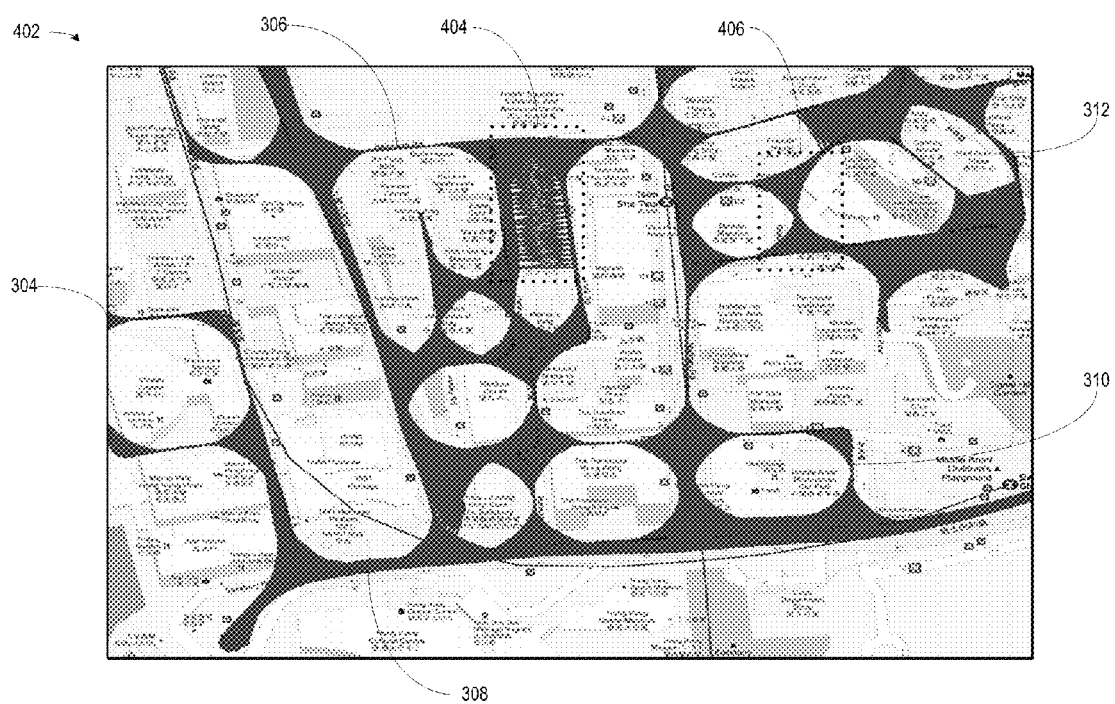
FIG. 4 illustrates an example of determining candidate intersections according to aspects of this disclosure.

The path server 104 may execute the intersection identification instructions 214 with the processor 204 to identify candidate intersections from the paths to be optimized 306-312. FIG. 4 illustrates an example 402 of the path server 104 identifying candidate intersections from the paths to be optimized 306-312 according to aspects of the disclosure. Examples of candidate intersections are encompassed by dashed boxes 404 and 406.

In one embodiment, poses of the one or more paths to be optimized 306-312 may be identified as candidate intersections based on one or more intersection characteristics, which may include the distance between poses, the latitudinal proximity of poses, the longitudinal proximity of poses, and other such characteristics. For example, the path server 104 may identify poses as candidate intersections when poses of one or more paths are relatively proximate to one another, such as being within twenty meters, ten meters, 100 meters, or other distance amounts. As another example, the path server 104 may identify poses as candidate intersections when the poses are within a threshold degree of latitude or longitude.

In one embodiment, the path server 104 may determine candidate intersections for any pose from any vehicle path. In other words, the path server 104 may determine candidate intersections from a first path and a second path regardless of whether the first path and the second path travel the same, or nearly the same, route. In this regard, the path server 104 may identify candidate intersections where the paths intersect or overlap.

In another embodiment, the path server 104 may determine candidate intersections for poses within paths that have travelled the same, or substantially the same, route. In this embodiment, the path server 104 may identify candidate intersections from two paths, e.g., $path_1$ and $path_2$, which are substantially similar, but where the vehicle traveled these paths at different times, e.g., $path_1$ at time $t_1$, where $t_1$ is 12:00 P.M. on January 1st, and $path_2$ at time $t_2$, where $t_2$ is 4:00 P.M. on March 3rd. $Path_1$ may include poses (e.g., location, orientation, etc.) that are similar to the poses of $path_2$.

Having determined candidate intersections from the one or more paths to be optimized 306-312, the path server 104 may then determine a relative pose that relates poses of candidate intersections. The relative pose may specify the relative three-dimensional translation and/or three-dimensional rotation between poses. Moreover, the relative pose for a given set of candidate intersections may be used as a constraint in the path optimization performed by the path optimizing clients 106-112.

Figure 5:
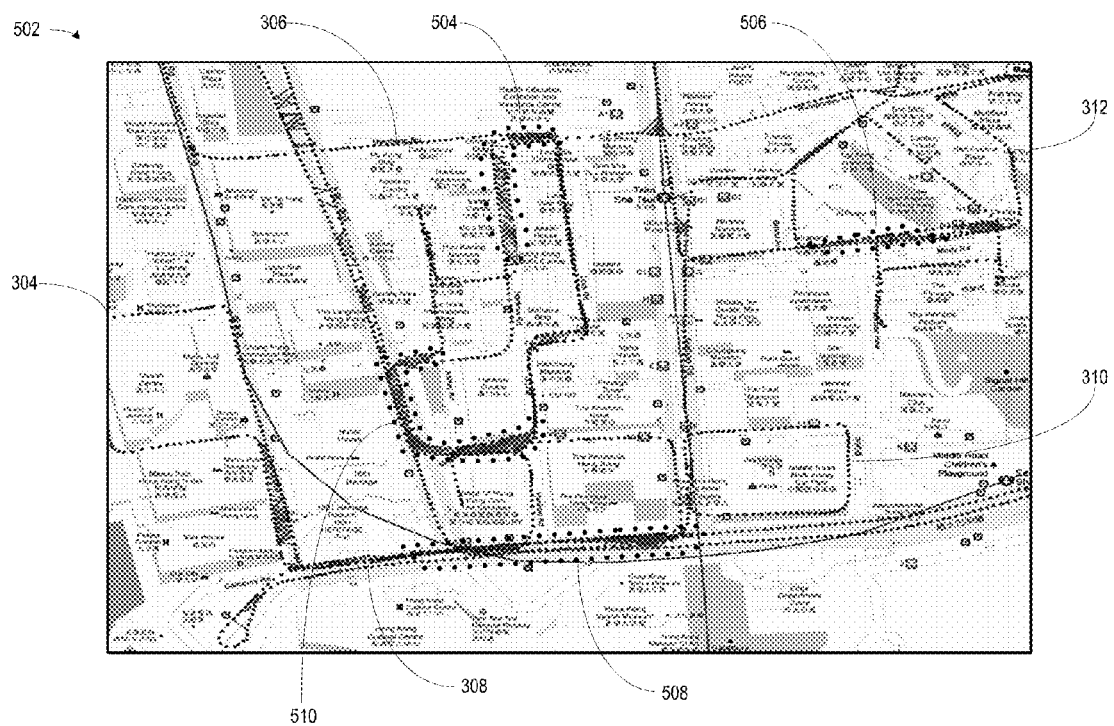
FIG. 5 illustrates an example of the determining relative poses for the candidate intersections according to aspects of this disclosure.

In one embodiment, the path server 104 may execute the feature matching instructions 216 to determine the relative poses of the candidate intersections. FIG. 5 illustrates an example 502 where the path server 104 has determined relative poses for the candidate intersections. Boxes 504-510 highlight just a few examples of relative poses for candidate intersections, in which the poses of the candidate intersections are valid poses.

In one embodiment, the path server 104 may leverage the imagery associated with the poses of the candidate intersections to determine the relative poses. For example, where imagery is available at predetermined intervals along the corresponding paths of the poses of the candidate intersections, the path server 104 may determine the relative poses from the associated imagery. In this example, the path server 104 may determine the relative pose for a candidate intersection by performing feature matching on the poses of the candidate intersection, and then determining a three-dimensional relative pose that is consistent with the matched features.

A three-dimensional relative pose may be considered consistent when the translation and/or orientation of the relative pose aligns the matched features of the images associated with the poses within a threshold amount, which may be measured in distance (e.g. millimeters, centimeters, etc.) or degrees (e.g., one degree, two degrees, etc.). Examples of features that may be matched from the imagery may include a building or portion thereof (e.g., the corner of the building), a roadsign or portion thereof (e.g., lettering, edges, or other features of the roadsign), and other such features that are common between the imagery of the poses.

In addition, the determination of a relative pose may validate whether a pair of poses are valid for a candidate intersection. For example, where a relative pose cannot be determined for a given pair of poses from a candidate intersection, such as where the imagery associated with the poses do not contain matching features, the failure to determine the relative pose may indicate that the poses are not valid for the candidate intersection. A failure to determine the relative pose may further indicate that the imagery from the poses of the candidate intersection will not align (i.e., the imagery from the poses are too different or do not have matching features). Thus, while the path server 104 may initially determine that a pair of poses meet a predetermined threshold for a candidate intersection (e.g., the pair of poses are within a threshold distance), the imagery associated with the poses may indicate that the poses are not valid for optimization by the path optimizing clients 106-112.

The path server 104 may determine the relative poses using structure-from motion methods that vary according to the type of imagery associated with the poses of the candidate intersections. For example, where the imagery of the poses is obtained with a shutter camera, the path server 104 may determine the relative pose using methods such as the 5-Point Algorithm and the Random Sample Consensus ("RANSAC") algorithm. In another example, where the imagery of the poses is obtained with a rosette of rolling shutter cameras, the path server 104 may identify one or more features from the imagery, such as the façade of a building, and track these features across the imagery of the poses of the candidate intersections. In tracking these features, the path server 104 may determine that the feature being tracked is consistent across the imagery in both appearance and geometry (e.g., given imagery of a building having four corners, a corner being tracked is the same corner, in both appearance and geometry, across the images associated with the poses of the candidate intersections).

Where the path server 104 is leveraging tracked features, the relative pose for a candidate intersection may be simplified to determining the rigid transform that represents the relative pose. In one embodiment, the path server 104 may use an SFM algorithm, such as the RANSAC algorithm, to determine the rigid transform representing the relative pose.

Accordingly, the feature matching instructions 216 may include instructions that apply different algorithms for determining the relative pose for candidate intersections depending on the imagery associated with the poses of the candidate intersections. Thus, regardless of type of images associated with the poses of the candidate intersections, the path server 104 may determine whether the poses of the candidate intersection are valid and, if so, a relative pose that relates the poses.

After relative poses are determined for valid candidate intersections, the path server 104 may determine a partitioning scheme by which to partition the paths to be optimized 222. As previously discussed, performing path optimization on a large scale, e.g., a city, county, state, country or planet-wide scale, may require significant computing resources (e.g., processor cycles, memory, network bandwidth, etc.). Accordingly, the instructions 210 of the path server 104 may include partitioning schema instructions 218 which, when executed by the processor 204, may cause the path server 104 to partition the paths to be optimized 222, e.g., paths 306-312, into partition cells 226 for optimization by the path optimizing clients 106-112. By partitioning the paths to be optimized into partition cells 226, the path server 104 reduces the computing resources needed to optimize the portions of one or more paths included within a given partition cell.

Figure 6:
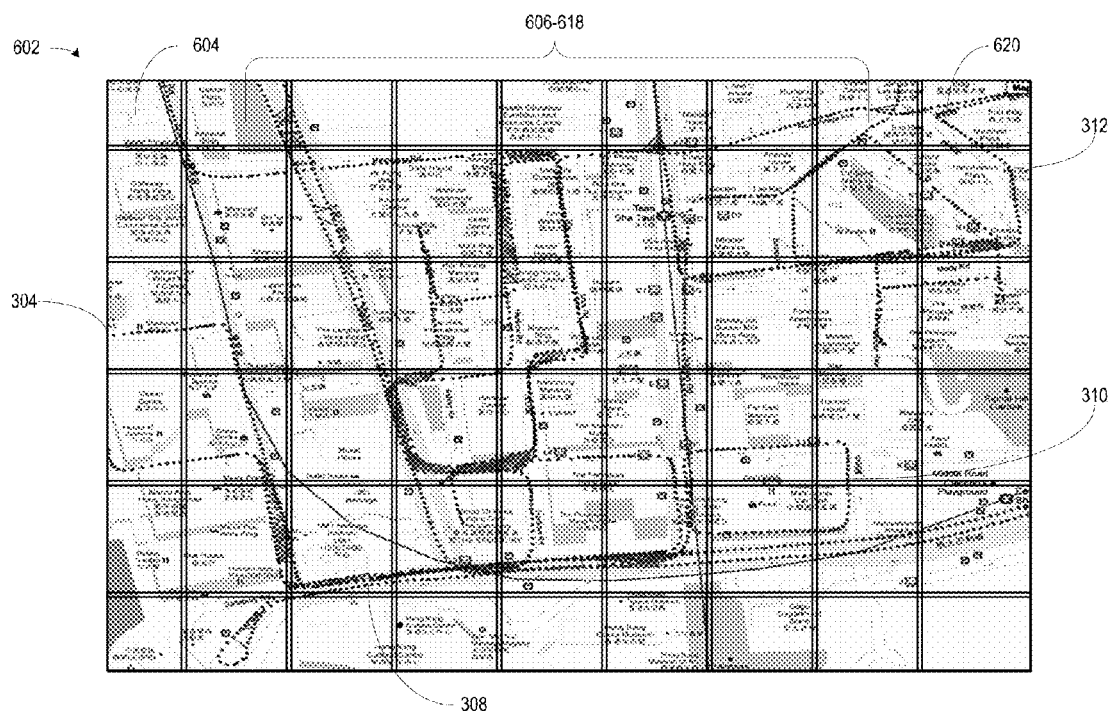
FIG. 6 illustrates an example of applying a partition schema to a set of paths to be optimized according to aspects of this disclosure.

FIG. 6 illustrates an example 602 in which a partition schema is applied to the paths to be optimized 222 according to aspects of this disclosure. The partition schema may include partitioning the paths to be optimized 222 into one or more partition cells 226, which are shown individually in FIG. 6 as exemplary partition cells 604-620. In one embodiment, a partition cell may be defined as a set of coordinates (one or more pairs of latitude or longitude coordinates), and portions of paths to be optimized that are within the set of coordinates, or at the boundary of those coordinates, may be considered within the partition cell. A partition cell may also be defined by other identifiers, such as a pair of latitude and longitude coordinates, along with a width and height parameter.

The partition schema may be based on one or more factors, which may include the number of path optimizing clients in communication with the path server 104, the size of the geographic area being partitioned, the number of paths to be optimized, the number of poses in the paths to be optimized, the computing power of the path optimizing clients, etc.

For example, the path optimizing server 104 may query, or be preprogrammed with, the computing capabilities (e.g., processor speed, available memory, network bandwidth, etc.) of each of the path optimizing clients 106-112. The server 104 may then partition the paths to be optimized 222 into partition cells, where the computing resources needed to optimize a set of paths of a given partition cell meet or do not exceed the computing resources for the path optimizing clients 106-112. In another embodiment, the path server 104 may be preprogrammed to partition the paths to be optimized into a predetermined number of partition cells.

In addition to applying a partition schema to the paths to be optimized 226, the path server 104 may also include the boundary identification instructions 220 for determining one or more boundary stabilizers, e.g., the boundary stabilizers 232 of FIG. 2, for one or more of the partition cells 226. In general, a boundary stabilizer may be an identifier that indicates to a path optimizing client that a particular portion of a path to be optimized should not, in fact, be optimized. The boundary stabilizers 232 may exclude a portion of a path to be optimized, such that a first portion of the path in one partition cell is not inadvertently misaligned with a second portion of the path in an adjacent cell. A boundary stabilizer may further identify a location where a path to be optimized crosses or straddles the boundary between adjacent partition cells.

Figure 7:
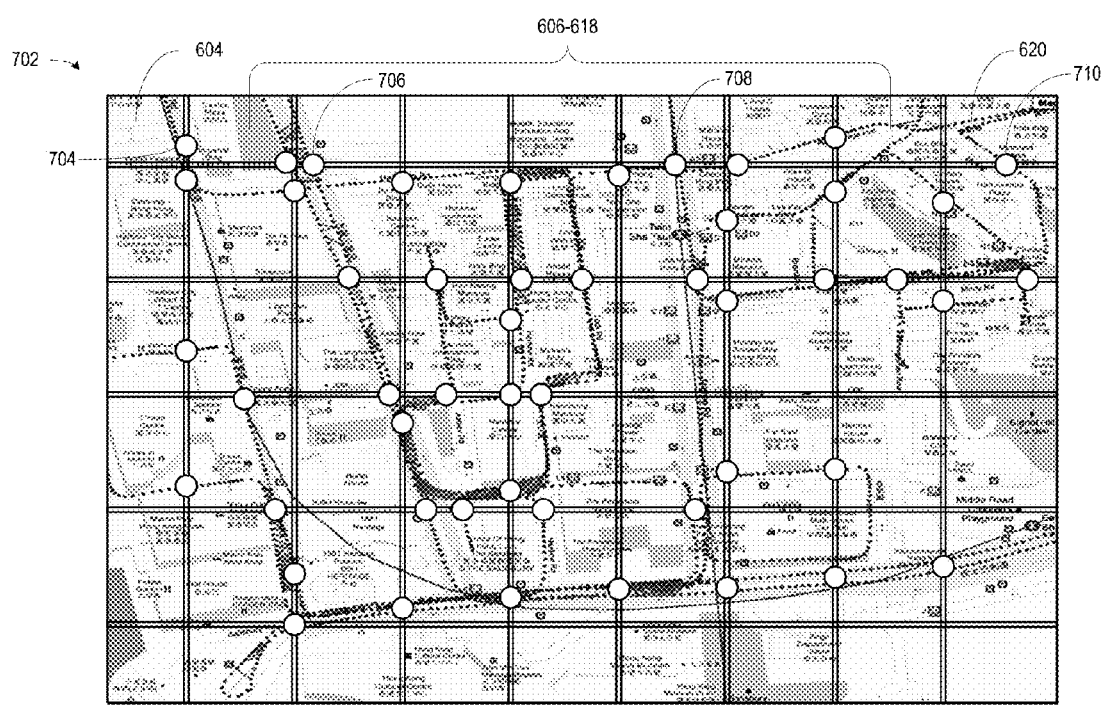
FIG. 7 illustrates an example of the determining boundary stabilizers for the partition cells of the paths to be optimized according to aspects of this disclosure.

FIG. 7 illustrates an example where boundary stabilizers 232 for the partition cells 226 of the paths to be optimized have been determined according to aspects of this disclosure. In one embodiment, the path server 104 may identify a boundary stabilizer where a path to be optimized crosses or straddles the boundary of a partition cell. The path server 104 may perform this determination by comparing (a) the geolocation coordinates of the poses associated with the path to be optimized with (b) the parameters (e.g., latitude, longitude, height, width, etc.) that define the partition cell in which the path to be optimized is located.

FIG. 7 illustrates various examples of boundary stabilizers 232, including boundary stabilizer 704 for the partition cell 604, boundary stabilizer 706 for the partition cell 608, boundary stabilizer 708 for the partition cell 614, and boundary stabilizer 710 for the partition cell 620. In one embodiment, a boundary stabilizer may be defined as a set of coordinates, such as a pair of latitude and longitude coordinates, where the path optimizing clients 106-112 do not factor in the portion of the path to be optimized at the defined set of coordinates. In another embodiment, a boundary stabilizer may be identified as a range of coordinates, e.g., a range of latitude and/or longitude coordinates, such that portions of paths to be optimized (such as one or more poses from candidate intersections) that are within the range of the boundary stabilizer coordinates are not factored in the optimization of the partition cell.

In this manner, the path server 104 may determine one or more boundary stabilizers 232 for the partition cells 226 to be optimized by the path optimizing clients 106-112.

Figure 8:
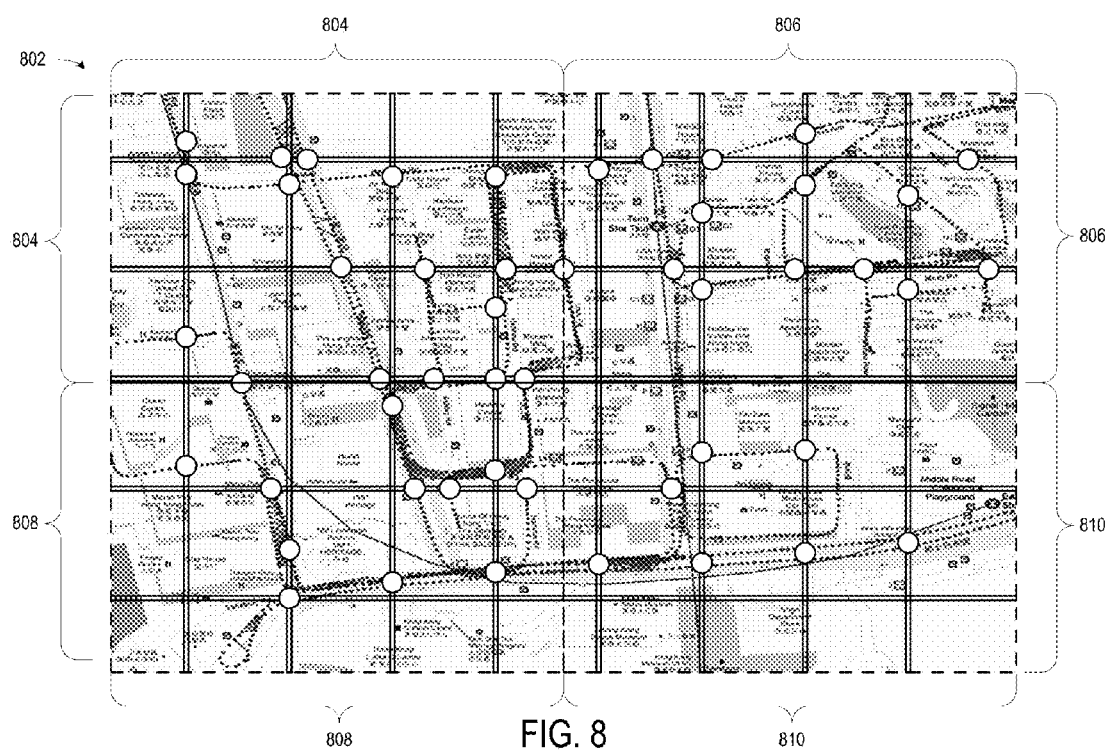
FIG. 8 illustrates an example of determining which grid sections to send to the path optimizing clients devices according to aspects of this disclosure.

The path server 104 may then assign one or more of the partition cells 226 to be optimized by the path optimizing clients 106-112. In one embodiment, the partition cells 226 may be optimized in a round-robin fashion, where each path optimizing client is sequentially assigned a partition cell to be optimized. In another embodiment, a group of partition cells may be assigned to a path optimizing client for optimization. FIG. 8 illustrates an example 802 where a first group 804 of partition cells has been assigned to the path optimizing client 106, a second group 806 of partition cells has been assigned to the path optimizing client 108, a third group 808 of partition cells has been assigned to the path optimizing client 110, and a fourth group 810 of partition cells has been assigned to the path optimizing client 112.

Although FIG. 8 illustrates that the various partition cells have been assigned to the four groups 804-810 for optimization, the path server 104 may group the partition cells into fewer or more groups of partition cells for optimization. In one embodiment, there may be no groups of partition cells for optimization, and the path server 104 may send partition cells to path optimizing clients 106-112 based on the availability of computing resources to the individual path optimizing clients 106-112.

Referring back to FIG. 2, in addition to sending the paths 228 of a partition cell to optimize and corresponding boundary stabilizers 232, the path server 104 may also send one or more constraints 230 to a path optimizing client for inclusion in the path optimization. In general, the optimization of a partition cell performed by the path optimizing clients 106-112 may be a non-linear optimization in which the paths of the partition cell are precluded from changing shape locally, and the constraints may satisfy the relative poses (i.e., geometric relationships) previously determined by the path server 104. In effect, the constraints ensure that the optimization does not violate physical laws or boundaries, which would result in unrealistic or physically questionable alignments.

The constraints for the optimization being performed by the path optimizing clients 106-112 may include the relative poses previously discussed (e.g., the rigid transforms that define the relative poses), sensor constraints, such as wheel odometry sensor readings or geolocation readings (e.g., GPS readings), natural/physical constraints, such as the direction of gravity, and other such constraints.

Accordingly, when the path server 104 sends the partition cells 226 to be optimized by an individual path optimizing clients 106-112, the path server 104 may send the paths 228, the constraints 230 for the optimization, and the boundary stabilizers 232.

Figure 9:
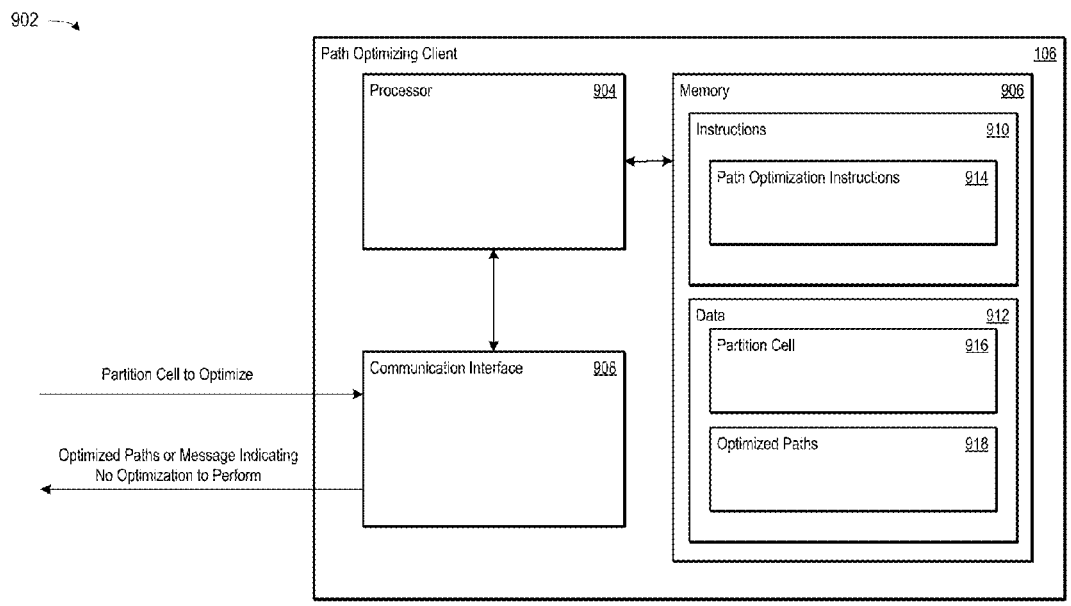
FIG. 9 illustrates an example of a path optimizing client device according to aspects of this disclosure.

FIG. 9 illustrates an example 902 of a path optimizing client, e.g., the path optimizing client 106, according to aspects of this disclosure. In one embodiment, the path optimizing client 106 may include a processor 904 a computer-readable memory 906, and a communication interface 908.

The computer-readable memory 906 may store information accessible by the processor 904, such as instructions 910 and data 912 that may be executed or otherwise used by the processor 904 to determine whether the paths of a partition cell may be optimized and, if so, perform the optimization.

In general, the computer-readable memory 906 may be of any type of computer-readable memory operative to store information accessible by the processor 904, including a computer-readable medium, or other medium that stores data that may be read with the aid of an electronic device.

The communication interface 908 is configured to receive partition cells, e.g., partition cell 916, from the path server 104. The communication interface 908 may also be configured to send optimized paths of the partition cell 916 to the path server 104 or, when the path optimizing client 106 determines that there is no further optimization to perform, a message or other identifier indicating that no further optimization on the partition cell 916 was performed.

When the path optimizing client 106 receives the partition cell 916 to optimize, the processor 904 may execute one or more instructions 910 stored in the computer-readable memory 906, such as path optimization instructions 914. As previously discussed, the path optimizing client 106 may perform a non-linear optimization on the paths of the partition cell 916, where the constraints and boundary stabilizers of the partition cell 916 may preclude certain portions of the paths from being optimized. When the optimization is complete, the path optimizing client 106 may send the optimized paths to the path server 104.

Alternatively, the path optimizing client 106 may determine that no further optimization on the paths of the partition cell 916 is needed or required. In one embodiment, the path optimizing client 106 may send a message or other identifier to the path server 104 that no further optimization was performed, and/or that no further optimization on the paths of the partition cell 916 is needed or required. The path optimizing client 106 may also identify that certain portions of the paths of the partition cell 916, such as the paths identified by the boundary stabilizers, were excluded from the optimization process.

The path server 104 may maintain a record of which partition cells of the partitioning schema have been optimized. When the path server 104 determines that a predetermined number of partition cells, such as all of the partition cells or any other number of partition cells, have been optimized, the path server 104 may determine whether there are paths, or portions of paths, that have not yet been optimized.

In a first iteration of the optimization process, non-optimized portions of the paths may include those that were initially excluded by the boundary stabilizers. To ensure that these initially, non-optimized portions are, in fact, optimized, the path server 104 may re-determine a partitioning schema for the paths to be optimized. In one embodiment, re-determining the partitioning schema may include shifting the boundaries of the partition cells by a predetermined amount, such as a predetermined distance or a predetermined number of degrees in latitude and/or longitude, so that portions of paths that previously crossed or straddled a partition cell boundary are included within the partition cell.

Figure 10:
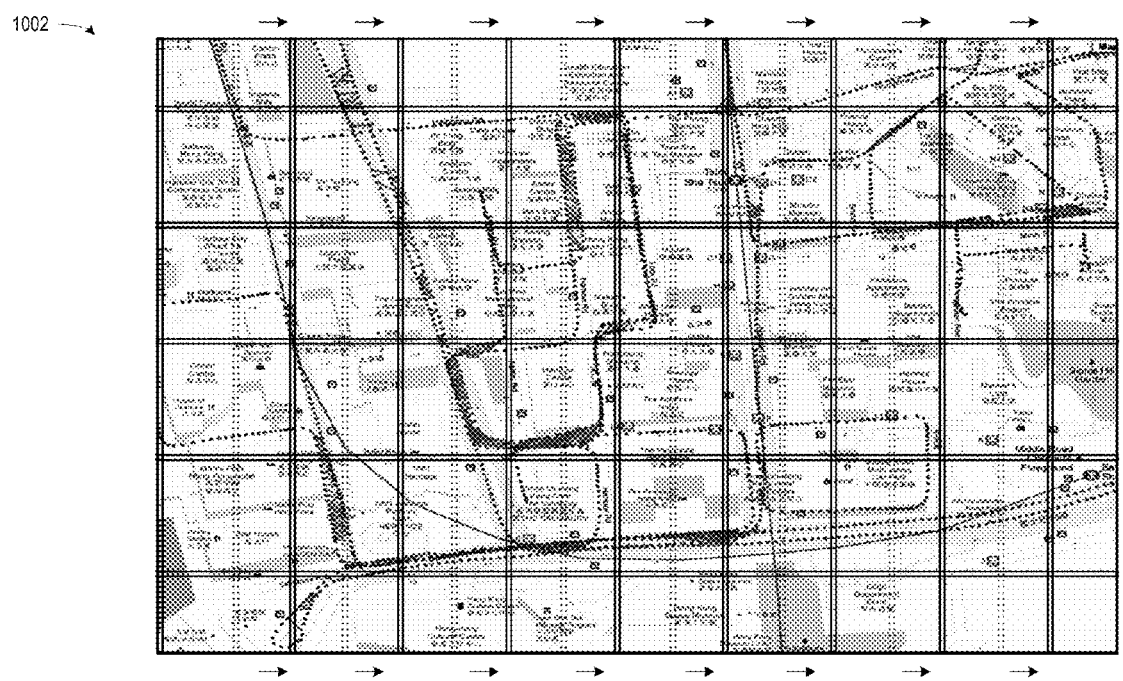
FIG. 10 illustrates an example of re-determining grid sections for refining the optimization of the paths according to aspects of this disclosure.

FIG. 10 illustrates an example 1002 of shifting the boundaries of the initially determined partition cells. After the boundaries of the partition cells have been shifted, the path server 104 may then re-send the re-determined partition cells to the path optimizing clients 106-112 for optimization.

The path server 104 may continuously perform this shifting and re-sending of partition cells until a predetermined termination condition is met, such as by receiving a message from one or more of the path optimizing clients 106-112 that no optimization on a received partition cell is possible. In another embodiment, the predetermined termination condition may include that a predetermined number of partition cells have been sent to the path optimizing clients 106-112 (e.g., all of the partition cells), and that each of the path optimizing clients 106-112 have communicated that no further optimization on a received partition cell is possible. In this manner, the iterative process of shifting and re-sending of partition cells ensures that no portion of a path to be optimized was not optimized because it crossed or straddled the boundary of a partition cell.

Figure 11:
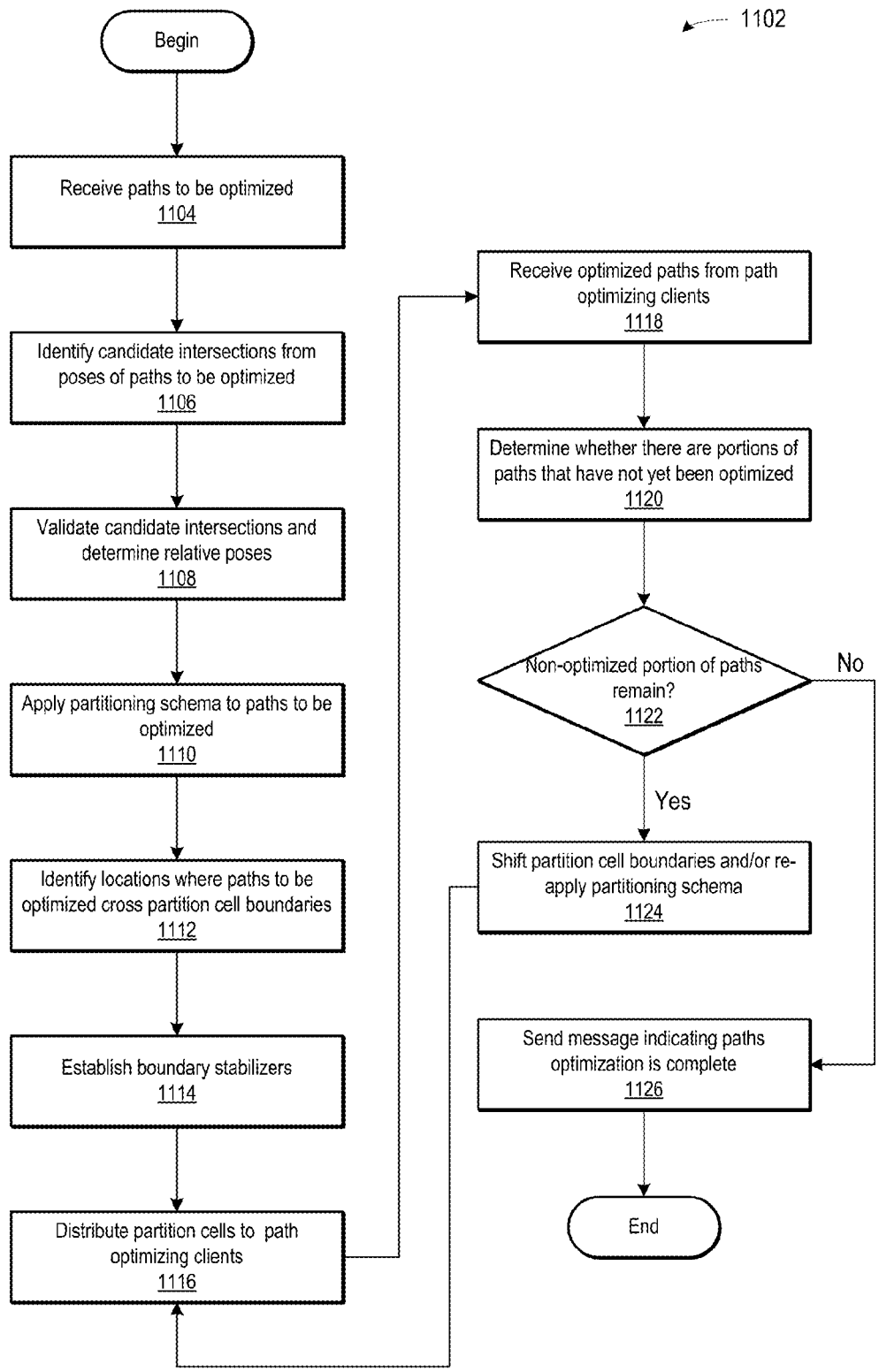
FIG. 11 illustrates an example of logic flow for performing loop closing using structure-from-motion methods according to aspects of this disclosure.

FIG. 11 illustrates an example logic flow 1102 for performing loop closing using structure-from-motion methods according to aspects of this disclosure. In one embodiment, the server 104 may receive one or more paths to be optimized (Block 1104). As previously discussed the paths may include paths obtained from a vehicle, where the paths include one or more poses of the camera-mounted vehicle and each pose includes one or more images obtained by the vehicle.

The path server 104 determines candidate intersections from poses of the received paths (Block 1106). In one embodiment, the path server 104 may determine the candidate intersections based on one or more intersection characteristics, which may include the distance between poses, the latitudinal proximity of poses, the longitudinal proximity of poses, and other such characteristics.

When candidate intersections have been identified, the path server 104 may then validate the candidate intersections by determining relative poses between poses of candidate intersections (Block 1108). In one embodiment, the relative poses may be determined using structure-from-motion methods. In addition, the determined relative poses may be one type of constraint used in the path optimization of the paths received by the path server 104. Other constraints may include the sensor readings (e.g., GPS coordinates, odometry readings, etc.) from the vehicle or other apparatus used to obtain the paths to be optimized.

After determining the relative poses for the candidate intersections, the path server 104 may then apply a partitioning schema to the paths to be optimized (Block 1110). In one embodiment, this results in one or more partition cells, where the partition cells may be defined by one or more pairs of latitude and longitude coordinates, a height parameter, a width parameter, and other such parameters. A partition cell may include one or more paths to be optimized by the path optimizing clients 106-112.

The path server 104 determines boundary stabilizers for the one or more partition cells obtained from the application of the partitioning schema. In one embodiment, the path server 104 may initially determine locations where the paths to be optimized cross or straddled partition cell boundaries (Block 1112). The path server 104 may perform this determination by comparing geolocation information of the poses of the paths to be optimized with the boundaries of a given partition cell. Where a path crosses or straddles a partition cell boundary, the path server 104 may establish a boundary stabilizer at the boundary location (Block 1114). In one embodiment, a boundary stabilizer is identified by a pair of latitude and longitude coordinates.

The path server 104 may then distribute the determined partition cells to the path optimizing clients 106-112 (Block 1116). In one embodiment, the distribution may be round-robin based, where the path server 104 distributes partition cells to available path optimizing clients 106-112. In another embodiment, partition cells may be assigned to a path optimizing client.

When a path optimizing client is finished with a partition cell, the path server 104 may receive the optimized paths of the partition cell (Block 1118). Alternatively, the path server 104 may receive a message from a path optimizing client that no optimization is needed on the given partition cell. The path server 104 may then determine whether there are portions of the paths of the partition cell that have yet to be optimized (Block 1120). The path server 104 may perform this determination based on the message it receives from the path optimizing clients 106-112 and/or by monitoring which paths of the partition cell are associated with boundary stabilizers.

Where the path server 104 determines that non-optimized portions of paths remain (Block 1122), the path server 104 may shift the boundaries of the partition cells and/or re-apply the partitioning schema to determine new partition cells (Block 1124). When the boundaries of the partition cells have been shifted, the path server 104 may then re-distribute the partition cells to the path optimizing clients 106-112. The path server 104 may iterate in this manner through the paths to be optimized until a predetermined number of paths have been optimized, such as all paths, a percentage of paths (e.g., 80% of all paths), an absolute number of paths (e.g., 15 out of 20 paths to be optimized), or some other number of paths.

When it is determined that the paths to be optimized have been optimized, the path server 104 may send a message or other identifier indicating that the path optimization is complete (Block 1126).

In this manner, the system may be configured to perform loop closing on a large-scale set of paths using structure-from-motion techniques. For example, as the path server 104 leverages a partitioning schema to distribute paths to be optimized to one or more path optimizing clients 106-112, the path server 104 reduces the amount of computing resources needed to optimize the paths. Moreover, as the path server 104 may be configured to account for the varying capabilities of the path optimizing clients 106-112, the path server 104 may distribute the paths to be optimized such that bottlenecks (i.e., an overextension in computing resources) in determining optimized paths are avoided. Furthermore, the disclosed system is scalable such that additional path optimizing clients may be added to the system when additional computing resources are needed. Thus, the disclosed system and methods present an advantage over current techniques for performing loop closing using structure-from-motion methods.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A system for performing loop closing, the system comprising:
   a computer-readable memory that stores a plurality of paths to be improved, wherein each path of the plurality of paths comprises one or more poses having therewith associated an image and a geographic location of a mobile apparatus; and
   one or more processors in communication with the computer-readable memory, the one or more processors being configured to:
     identify a plurality of candidate intersections between poses of different paths of the plurality of paths based on the geographic locations of the one or more poses of each of the plurality of paths;
     determine, for each particular candidate intersection of the plurality of candidate intersections, a relative pose based on the images associated with the poses of the different paths of the particular candidate intersection;

partitioning the plurality of paths to obtain one or more partition cells, each partition cell including the poses of at least one particular candidate intersection of the plurality of candidate intersections and the determined relative pose for the at least one particular candidate intersection, wherein each one of the plurality of paths is assigned to at least one of the one or more partition cells;

send the one or more partition cells to one or more client devices for improving the paths assigned to the one or more partition cells; and receive, in response to sending the one or more partition cells, an improved path from the client device, the improved paths being based on at least one of the determined relative poses.

2. The apparatus of claim 1, wherein the processor is further configured to identify a given candidate intersection of the plurality of candidate intersections further based on the proximity of the geographic locations of the poses of the given candidate intersection.

3. The apparatus of claim 1, wherein the processor is further configured to determine a given determined relative poses for one particular candidate intersection of the plurality of candidate intersections by applying a structure-from-motion technique to the images of the poses of the one particular candidate intersection.

4. The apparatus of claim 1, wherein the processor is further configured to determine a boundary stabilizer for a portion of a given one of the paths assigned to the at least one partition cell, the boundary stabilizer identifying the portion of the path that is not to be improved by the client device.

5. The apparatus of claim 4, wherein the boundary stabilizer identifies a location where the portion of the given path crosses a boundary of the partition cell to which the given path is assigned.

6. The apparatus of claim 4, wherein the boundary stabilizer comprises a pair of geolocation coordinates.

7. The apparatus of claim 1, wherein the partitioning schema is based on computing resources available to the one or more client devices.

8. The apparatus of claim 1, wherein the processor is further configured to re-apply the partitioning schema to the plurality of paths to be improved based on whether non-improved portions of the paths assigned to the one or more partition cells remain after improvement by the one or more client devices.

9. The apparatus of claim 1, wherein the processor is further configured to re-determine the boundaries of the one or more partition cells based on whether non-improved portions of the paths assigned to the one or more partition cells remain after improvement by the one or more client devices.

10. The apparatus of claim 1, wherein the processor is further configured to iteratively apply the partitioning schema to the plurality of paths to obtain the one or more partition cells and to send the one or more partition cells to the one or more client devices for improving the paths assigned to the one or more partition cells until a predetermined termination condition is met.

11. A method for performing loop closing, the method comprising:

identifying, by one or more processors, a plurality of candidate intersections between poses of different paths of a plurality of paths to be improved, each of the one or more poses having associated therewith an image and a geographic location, and identifying the plurality of candidate intersections is based on the geographic locations of the one or more poses of the plurality of paths;

determining, by the one or more processors, for each particular candidate intersection of the plurality of candidate intersections, a relative pose based on the images associated with the poses of the different paths of the particular candidate intersections;

partitioning, by the one or more processors, the plurality of paths to obtain one or more partition cells, each partition cell included in the poses of at least one particular candidate intersection of the plurality of candidate intersections and the determined relative pose for the at least one particular candidate intersection, wherein each of the plurality of paths is assigned to at least one of the one or more partition cells;

sending, by the one or more processors, the one or more partition cells to a client device for improving the paths assigned to the one or more partition cells; and receiving, by the one or more processors, in response to sending the one or more partition cells, improved paths from the client device, at least one of the improved paths being based on at least one determined relative pose.

12. The method of claim 11, wherein:

identifying the plurality of candidate intersections comprises identifying a given candidate intersection of the plurality of candidate intersections further based on the proximity of the geographic locations of the poses of the given candidate intersection.

13. The method of claim 11, wherein:

determining a given relative pose for one particular candidate intersection of the plurality of candidate intersections includes applying a structure-from-motion technique to the images of the poses of the one particular candidate intersection.

14. The method of claim 11, further comprising:

determining, with the processor, a boundary stabilizer for a portion of a path of the paths assigned to the at least one partition cell, the boundary stabilizer identifying a portion of the path that is not to be optimized by the client device.

15. The method of claim 14, wherein the boundary stabilizer identifies a location where the portion of the path crosses a boundary of the partition cell to which the given path is assigned.

16. The method of claim 14, wherein the boundary stabilizer comprises a pair of geolocation coordinates.

17. The method of claim 11, wherein the partitioning schema of the plurality of paths is based on computing resources available to the client device.

18. The method of claim 11, further comprising:

re-applying, with the processor, the partitioning schema to the plurality of paths to be optimized based on whether non-optimized portions of the paths assigned to the one or more partition cells remain after optimization by the client device.

19. The method of claim 11, further comprising:

re-determining, with the processor, the boundaries of the one or more partition cells based on whether non-optimized portions of the paths assigned to the one or more partition cells remain after optimization by the client device.

20. The method of claim 11, further comprising:

iteratively performing, with the processor, the applying of the partitioning schema to the plurality of paths to obtain the one or more partition cells and the sending of the one or more partition cells to a client device for optimizing the paths assigned to the one or more partition cells until a predetermined termination condition is met.

* * * * *